Feb. 2, 1960   F. W. PARRISH   2,923,869
MOUNTING ARRANGEMENT
Filed Dec. 28, 1956

INVENTOR.
FRANK W. PARRISH
BY
D. Gordon Angus
ATTORNEY.

United States Patent Office 2,923,869
Patented Feb. 2, 1960

2,923,869
MOUNTING ARRANGEMENT

Frank W. Parrish, Lakewood, Calif., assignor to International Rectifier Corporation, El Segundo, Calif., a corporation of California Application December 28, 1956, Serial No. 631,210

14 Claims. (Cl. 317—234)

This invention relates to rectifiers and to means for mounting the same.

An object of this invention is to provide a mounting means whereby a plurality of rectifiers can be assembled into a unitary circuit element.

According to this invention a mounting means comprises a pair of mounting plates which are spaced from each other by a spacer. A bolt is passed through the mounting plate and spacer so as to hold the three in a spaced relationship. Rectifiers can then be mounted to the two mounting plates for incorporation in a circuit.

According to a preferred but optional feature of the invention, an additional pair of spacers are provided which space a pair of cover plates from the aforesaid mounting plates. The mounting plates are provided with holes for receiving rectifiers, each rectifier being provided with a shoulder that bears against the mounting plate to which the rectifier is mounted. Conductive terminals are provided which are held to the mounting plates by means of eyelets which rivet the said terminal to the said mounting plates.

The above and other features of this invention will be fully understood from the following detailed description and the accompanying drawings, of which:

Figure 1:
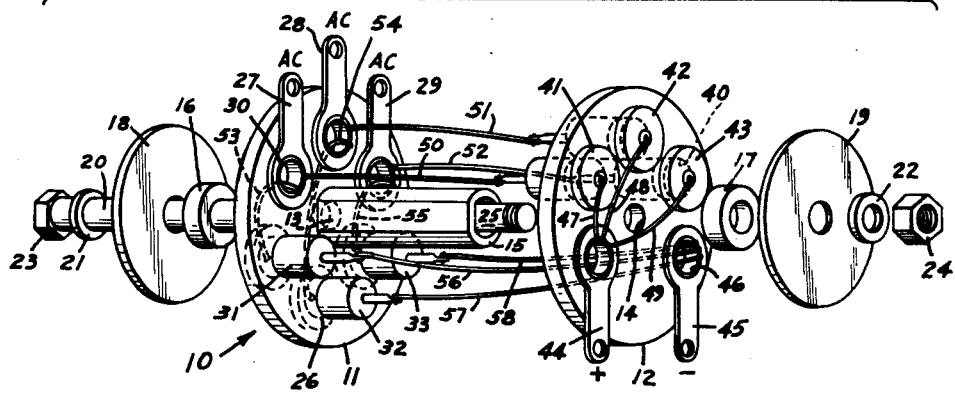
Fig. 1 is an exploded view showing the presently preferred embodiment of the invention.
Figure 3:
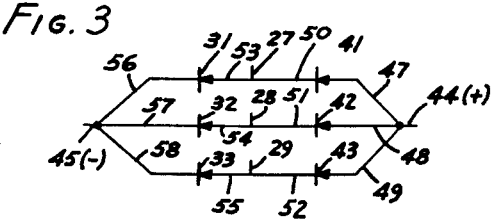
Fig. 3 shows the electrical circuitry of the device of Fig. 1.

Fig. 1 shows a circuit element 10 according to the invention, which is a three-phase bridge with the circuit properties shown in Fig. 3. A pair of mounting plates 11, 12 have mounting holes 13 and 14 therethrough respectively. A central spacer 15 is placed between the two mounting plates to hold them apart. Two additional spacers 16 and 17 are disposed on opposite sides of the stack consisting of the two mounting plates and the central spacer 15. A pair of cover plates 18, 19 are disposed outside of spacers 16 and 17.

The spacers 16 and 17 and the cover plates 18 and 19 have mounting holes therethrough which can be placed in registration to receive a bolt 20 which aligns all of the plates and spacers. The bolt carries a pair of washers 21 and 22 which are disposed on opposite ends of the assembly and the bolt has a head 23 which bears against one end thereof. Tightening means comprising a nut 24 for the threads 25 on the bolt enable the assembly to be tightened so as to make it a unitary structure.

Mounting plate 11 is provided with six additional holes 26. Conductive terminals 27, 28 and 29 are placed at three of these holes, eyelets 30 through the holes rivet the terminals to the mounting plates. The eyelets 30 are preferably made of a conductive material and can be of any desired type of rivet, the preferred rivet being a hollow headed eyelet as shown. The mounting plates are made of insulating material. Rectifiers 31, 32 and 33 are placed in the other three holes of mounting plate 11. A rectifier of this type is shown in detail in Fig. 2. Only rectifier 31 is shown in detail, it being understood that the other rectifiers are of similar construction. Such a rectifier has a conductive base plate 34 which may be of steel or some other conductive material to which a wafer 35 of silicon or another semiconductive metal is welded or otherwise fixed. A counterelectrode plate 36 is welded to the wafer 35. When the wafer 35 is made of silicon, the plate 36 will usually comprise an element selected from group III of the periodic table of elements, which selected element is preferably aluminum. A lead 37 is soldered to the plate 36 and passes through a layer of insulating material 38. If desired, an enclosure 39 may surround the insulating material. This housing 39 may have a circular cylindrical outer wall. A cylindrical or prismatic outer wall is preferable for use with this invention.

The rectifiers 31, 32 and 33 are installed in plate 11 with the shoulder of their respective base plates bearing against the mounting plate, and with the cylindrical outer wall of their housings 39 making frictional engagement in the respective holes 26.

Figure 2:
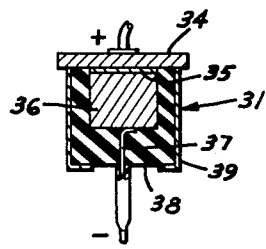
Fig. 2 is a side elevation, partly in cross-section, showing a rectifier of a type which is conveniently assembled into a circuit element according to this invention.

The other mounting plate 12 is provided with five holes 40 in which rectifiers 41, 42 and 43 are placed so that their shoulders bear against the mounting plate 12, and the cylindrical outer walls of their respective housings make frictional engagement in the holes 40 in the same manner as the rectifiers shown installed in mounting plate 11. Rectifiers 41, 42 and 43 may conveniently be of the same type as the rectifier 31 which is shown in Fig. 2. At two others of the holes in mounting plate 12, conductive terminals 44 and 45 are disposed and are assembled to the mounting plate by means of eyelets 46 or other types of rivets.

The mounting structure for holding the terminals and the rectifiers in spaced relationship have been described. The electrical circuit to make this unit into a circuit element such as a three-phase bridge circuit will now be described. For this purpose, leads 47, 48 and 49 are all connected to terminal 44. These leads are respectively connected to the positive terminal of rectifiers 41, 42 and 43.

The negative terminals of rectifiers 41, 42 and 43 are connected to terminals 27, 28 and 29 by leads 50, 51 and 52 respectively. The positive terminals of rectifiers 31, 32 and 33 are connected to the terminals 27, 28 and 29 by leads 53, 54 and 55, respectively. The negative terminals of rectifiers 31, 32 and 33 are all connected to terminal 46 by leads 56, 57 and 58, respectively.

The assembly is made up by threading each of the washers, spacers, and plates in order on to the bolt and tightening the nut 24 on to the threads 25. Thereafter the various leads will be soldered to make the connections as shown. When a conductive eyelet is used, the lead connections to the terminals may conveniently be made by soldering the lead to the eyelet itself. Otherwise, the leads may be soldered directly to the terminals. For purposes of disclosures in the exploded view of Fig. 1, leads 50, 51, 52, 56, 57 and 58, have been shown longer than they are, because when the device is assembled, the leads need only reach between their connections, which is a shorter distance than shown in the exploded view.

It will be recognized that in the three-phase bridge circuit shown, terminals 27, 28 and 29 are A.C. terminals, while terminals 44 and 45 are positive and negative D.C. terminals, respectively.

It will be appreciated that rectifiers of other types than silicon may be used, germanium or dry-plate rectifiers for example. It will be further recognized that other outer configurations than circular cylinders may be used with the rectifiers, only the most convenient form having been shown herein.

By means of this invention, there is provided an inexpensive means for assembling a circuit element which includes rectifiers. Assembling costs are considerably reduced and the resulting device is easily disassembled for selective replacement of defective parts. The cover plate substantially protects the fragile connections at the mounting plates from undesired mechanical contact from other articles.

This invention is not to be limited by the embodiment shown in the drawings and described in the description which is given by way of example and not of limitation, but only in accordance with the scope of the appended claims.

I claim:

1. A mount for a plurality of rectifiers comprising a pair of plates, each plate having a mounting hole therethrough, a spacer having a mounting hole therethrough, a mounting bolt passing through said mounting holes with the spacer located between said plates, and means tightening the plates and spacer together on said bolt, whereby said plates are mounted to the bolt and held spaced from each other, and rectifiers and terminal members which are attached to an individual one of each plate and which are adapted to be interconnected to form a circuit assembly, the terminal members and rectifiers being supported independently by the plate to which they are respectively attached.

2. A mount for a plurality of rectifiers comprising a pair of mounting plates and three spacers, said mounting plates and spacers having mounting holes and being assembled with their mounting holes aligned so as to form a stack with two of the spacers on opposite sides of the respective mounting plates and the third spacer between the mounting plates, and a pair of cover plates each having a mounting hole therethrough, one of said cover plates being disposed at each end of the stack with its mounting holes aligned with those of the mounting plates and spacers, said bolt passing through said mounting holes, and means tightening the stack on said bolt, whereby the aforesaid plates and spacers are held in assembled relationship, and rectifiers attached to said mounting plates for connection into a circuit.

3. Apparatus according to claim 2 in which the mounting plates are provided with holes therethrough, there being a rectifier projecting through at least one hole on each of the said plates, and in which conductive terminals are attached to said mounting plates, whereby said rectifiers and terminals are adapted to be interconnected so as to make a circuit in the device.

4. Apparatus according to claim 3, in which each rectifier is provided with a cylindrical outer configuration and a shoulder, the cylindrical portion being passed through one of said holes, so that the shoulder bears against the mounting plate.

5. A rectifier circuit comprising a pair of mounting plates, a pair of cover plates, said mounting plates being adjacent to each other and said cover plates being on opposite sides of the mounting plates from each other, and a spacer between each of said plates, the mounting plates having holes therethrough, rectifiers having a cylindrical external configuration and a shoulder thereon said rectifiers being passed through some of said holes in each mounting plate so that the shoulder bears against said mounting plates, terminals lugs and eyelets, said eyelets attaching said terminal lugs to said mounting plates, said eyelets passing through holes in said mounting plates, a bolt, means for tightening said bolt, said bolt passing through the said spacers and plates, whereby the bolt can be tightened so as to draw the plates and spacers into an integral structural unit, and conductive leads connecting the rectifiers to terminals.

6. Apparatus according to claim 5 in which each of said mounting plates is provided with three rectifiers, and in which one of said plates is provided with two terminals and the other of which mounting plates is provided with three terminals, the rectifiers in the plate having the two terminals all having the corresponding electrical end of each connected to one of the terminals on said plate, the other end of each of the said rectifiers being connected to one each of said terminals on the other mounting plate, the said terminals on the said other mounting plates being individually connected to respective ends of each of the three rectifiers on said other plates, the other end of said last mentioned three rectifiers all being connected to the other terminal on the first mentioned mounting plate.

7. A mount for a plurality of rectifiers comprising a pair of opposed plates, each plate having a mounting hole therethrough, a mounting bolt passing through said mounting holes, a spacer mounted on said bolts between said plates and mounting said plates spaced apart, and means on said bolt tightening the plates and spacer together, and rectifiers attached to said plates for connection into a circuit.

8. A rectifier assembly comprising a pair of mounting plates and a spacer, said mounting plates and spacer having mounting holes therethrough, and being assembled in a stack with the spacer between the mounting plates with the mounting plates aligned, a bolt passing through the mounting holes, means engaging the bolt to draw the stack tightly together, a pair of rectifiers and a pair of terminals mounted on and supported by each of said mounting plates, each of said rectifiers having a forward and a reverse end relating to the direction of current flow permitted by the rectifier, first conductive means interconnecting the reverse end of all rectifiers on a first of said mounting plates with a first terminal on the same mounting plate, second conductive means interconnecting the forward end of all rectifiers on the second of said mounting plates with the second terminal on the first mounting plate, third conductive means connecting the forward end of each of the rectifiers on the first mounting plate with an individual one of the terminals on the second mounting plate, and fourth conductive means connecting the reverse end of each of the rectifiers on the second plate with an individual one of the terminals on said second plate.

9. Apparatus according to claim 8 in which the conductive means comprises lead wires attached to a terminal at one end and to a rectifier at its other end.

10. Apparatus according to claim 9 in which a cover plate is mounted on said bolt on each side of said stack, and in which a spacer is placed between each mounting plate and each cover plate, the cover plate being of such size as to substantially cover the rectifiers on each plate.

11. Apparatus according to claim 10 in which each rectifier includes an exterior shoulder, the mounting plates having holes in which the rectifiers are engaged, their shoulders abutting against the mounting plate.

12. Apparatus according to claim 8 in which a first mounting plate is provided with a third rectifier whose reverse end is connected to the first terminal on said first mounting plate, and in which the second mounting plate is provided with a third terminal and a third rectifier, the reverse end of the third rectifier on the second plate and the forward end of the third rectifier on the first mounting plate being connected to the third terminal on the second mounting plate, the forward end of the third rectifier on the second mounting plate being connected to the second terminal on the first mounting plate.

13. Apparatus according to claim 12 in which a cover plate is mounted on said bolt on each side of said stack, and in which a spacer is placed between each mounting plate and each cover plate, each cover plate being of such dimensions as to overhang all of the rectifiers on the plate to which it is adjacent.

14. Apparatus according to claim 13 in which each rectifier includes an exterior shoulder, the mounting plates having holes in which each rectifier is engaged, with the shoulders abutting against the respective mounting plate.

References Cited in the file of this patent

UNITED STATES PATENTS

| | | |
|---|---|---|
| 1,833,332 | Peter | Nov. 24, 1931 |
| 1,900,732 | Place | Mar. 7, 1933 |
| 2,495,353 | Smith | Jan. 24, 1950 |
| 2,423,091 | Fiore et al. | July 1, 1957 |